United States Patent
Hawkes et al.

(10) Patent No.: US 9,612,927 B1
(45) Date of Patent: Apr. 4, 2017

(54) MANAGING SERVER PROCESSES WITH PROXY FILES

(71) Applicant: INTERNATIONAL BUSINESS MACHINES CORPORATION, Armonk, NY (US)

(72) Inventors: Jon Hawkes, Hampshire (GB); Neil G. S. Young, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/265,164

(22) Filed: Sep. 14, 2016

(51) Int. Cl.
G06F 11/20 (2006.01)

(52) U.S. Cl.
CPC ...... G06F 11/203 (2013.01); *G06F 2201/805* (2013.01); *G06F 2201/835* (2013.01)

(58) Field of Classification Search
USPC .................................................. 714/4.1, 4.11
See application file for complete search history.

(56) References Cited

U.S. PATENT DOCUMENTS

| | | | |
|---|---|---|---|
| 6,405,367 B1 * | 6/2002 | Bryant ................. | G06F 9/44563 717/115 |
| 7,694,170 B2 * | 4/2010 | Callaway ............ | G06F 11/1641 714/4.1 |
| 7,990,847 B1 | 8/2011 | Leroy et al. | |
| 8,266,474 B2 | 9/2012 | Goel | |
| 8,275,907 B2 * | 9/2012 | Thiel ................... | G06F 11/2025 709/202 |
| 9,235,484 B2 | 1/2016 | Nyuunoya | |
| 9,262,286 B2 | 2/2016 | Balogh et al. | |
| 2002/0054587 A1 * | 5/2002 | Baker ................. | G06F 11/0709 370/352 |
| 2003/0225885 A1 * | 12/2003 | Rochberger ........ | H04L 67/2847 709/226 |
| 2010/0030880 A1 * | 2/2010 | Joshi ................... | H04L 67/1095 709/223 |
| 2011/0270886 A1 * | 11/2011 | An ...................... | G06F 17/3007 707/785 |

(Continued)

OTHER PUBLICATIONS

"Failover and Replication in a Cluster", Oracle. BAE Systems 2016. pp. 1-30. https://docs.oracle.com/cd/E13222_01/wls/docs90/cluster/failover.html.

(Continued)

*Primary Examiner* — Kamini Patel
(74) *Attorney, Agent, or Firm* — Tutunjian & Bitetto, P.C.; Scott S. Dobson

(57) ABSTRACT

Computer-implemented methods and systems are provided for detecting a failed server. The computer-implemented method includes creating a proxy file for each server of a plurality of servers in an active state and assigning a timestamp to each proxy file of each server of the plurality of servers. The computer-implemented method further includes permitting each server to inspect each timestamp of each proxy file of each server of the plurality of servers and determining whether the timestamp assigned to each proxy file of each server of the plurality of servers exceeds a predetermined threshold. The computer-implemented method further includes, in response to a timestamp of a proxy file of a failed server exceeding the predetermined threshold, allowing another server of the plurality of servers to complete remaining work of the failed server.

20 Claims, 11 Drawing Sheets

(56) References Cited

U.S. PATENT DOCUMENTS

| | | | | |
|---|---|---|---|---|
| 2012/0060053 A1* | 3/2012 | White | ............... | G06F 11/2025 |
| | | | | 714/6.3 |
| 2014/0143590 A1* | 5/2014 | Bagga | ............... | G06F 11/1479 |
| | | | | 714/4.11 |
| 2015/0113172 A1* | 4/2015 | Johnson | ............... | H04L 67/34 |
| | | | | 709/245 |
| 2015/0242599 A1 | 8/2015 | Chowdhury | | |
| 2016/0065441 A1* | 3/2016 | Besehanic | ........... | H04L 43/0894 |
| | | | | 709/224 |

OTHER PUBLICATIONS

"Managing a proxy server cluster", IBM Knowledge Center. May 17, 2016. pp. 1-2. http://www14.software.ibm.com/webapp/wsbroker/redirect?version=phil&product=was-nd-dist&topic=tjpx_pscluster_manage.

* cited by examiner

MANAGING SERVER PROCESSES WITH PROXY FILES

BACKGROUND

Technical Field

The present invention relates generally to computing systems, and more specifically, to systems and methods for managing server processes with proxy files.

Description of the Related Art

The client/server model of distributed computing operates to fulfill user needs by splitting functions between "client" tasks and "server" tasks performed by computer hardware and software resources that are organized into a "network" for communication with each other. Using this model, a "client" program sends message requests to a "server" program to obtain data and/or processing action according to a communication "protocol" and the server completes the processing transaction by carrying out the request or deferring it to another time or by indicating that it cannot be fulfilled. This model allows clients and servers to be operated independently of each other in a computer network by using different hardware and operating systems.

A "proxy server" is often used in handling client requests for transactions to be completed by other network "application servers" which are capable of performing the data processing actions required for the transaction but are not accessed directly by the client. If a processing transaction is not successfully completed upon initial transmission of a message, the client can send retransmissions of the message to an application server using an "arrayed cluster" of proxy servers.

SUMMARY

In accordance with one or more embodiments, a computer-implemented method for detecting a failed server is provided. The computer-implemented method includes creating a proxy file for each server of a plurality of servers in an active state, assigning a timestamp to each proxy file of each server of the plurality of servers, and permitting each server to inspect each timestamp of each proxy file of each server of the plurality of servers. The computer-implemented method further includes determining whether the timestamp assigned to each proxy file of each server of the plurality of servers exceeds a predetermined threshold, and in response to a timestamp of a proxy file of a failed server exceeding the predetermined threshold, allowing another server of the plurality of servers to complete remaining work of the failed server.

In accordance with one or more embodiments, a system for detecting a failed server is provided. The system includes a memory and a processor in communication with the memory, wherein the computer system is configured to create a proxy file for each server of a plurality of servers in an active state, assign a timestamp to each proxy file of each server of the plurality of servers, permit each server to inspect each timestamp of each proxy file of each server of the plurality of servers, determine whether the timestamp assigned to each proxy file of each server of the plurality of servers exceeds a predetermined threshold, and in response to a timestamp of a proxy file of a failed server exceeding the predetermined threshold, allow another server of the plurality of servers to complete remaining work of the failed server.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

Throughout the drawings, same or similar reference numerals represent the same or similar elements.

DETAILED DESCRIPTION

The present embodiments are directed to systems and methods for detecting a failed server within a network.

Application servers monitor the state of their peer application servers in case they fail, thus leaving incomplete work. When an application server detects a peer application server to have failed, the failed application server is taken over by another application server configured to complete the remaining work or tasks of the failed application server.

In one or more embodiments, systems and methods are presented for detecting a failed application server based on management of a set of files in a dedicated file-system directory. The state of an application server is represented by the presence of a file that represents that application server. The file can act as a proxy for its server.

In one or more embodiments, systems and methods are presented for creating proxy files for each application server of a plurality of application servers. The proxy files of each application server can be stored in a common file system directory. Each application server that is part of a group of application servers owns a proxy file in the file system directory. The proxy file is deleted or removed when the application server it represents is shut down or deactivated.

In one or more embodiments, each application server periodically updates the timestamp on its proxy file. Additionally each application server periodically inspects the timestamps on the proxy files that belong to the other application servers, i.e., the peers in the group of application servers. If the timestamp of a proxy file is determined to be too "old" or "out-of-date," then the application server represented by the proxy file is considered to have failed. At this point, a peer application server (within the group of application servers) can take ownership of the proxy file and complete any necessary work or tasks for the failed application server. Once the work has been completed, the proxy file for the failed application server can be deleted or removed. Moreover, the process of coordinating access to proxy files can be managed through exclusive file locks to prevent more than one peer application server from attempting to complete work belonging to a failed application server. Thus, each proxy file created or generated can be associated with or assigned to a file lock.

In one or more embodiments, systems and methods for detecting a failure of an application server are presented and fault tolerance among peer servers is enabled by permitting each server to periodically update its own proxy file and check the timestamp of other application servers within a group of application servers. Additionally, if a failure is detected in the absence of a recent timestamp in the file, a takeover can be enabled by a peer application server.

Figure 1:
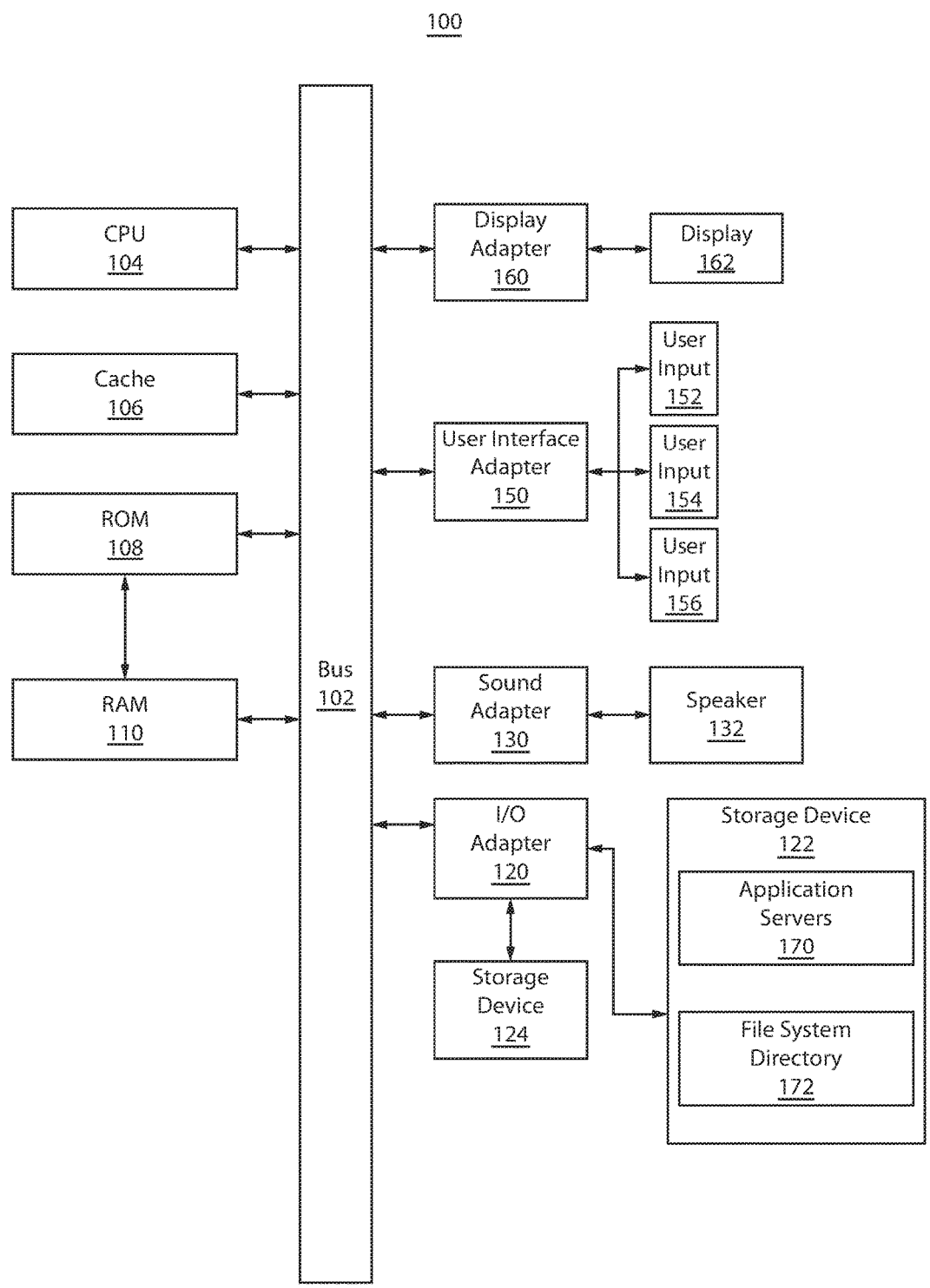
FIG. 1 is a block/flow diagram of an exemplary computing system for detecting a failed application server, in accordance with an embodiment of the present invention.

Referring now to the drawings in which like numerals represent the same or similar elements and initially to FIG. 1, a block/flow diagram of an exemplary computing system for detecting a failed application server is presented, in accordance with an embodiment of the present invention.

An exemplary server processing system 100 for detecting a failed application server to which the present invention may be applied is shown in accordance with one embodiment. The server processing system 100 includes at least one processor (CPU) 104 operatively coupled to other components via a system bus 102. A cache 106, a Read Only Memory (ROM) 108, a Random Access Memory (RAM) 110, an input/output (I/O) adapter 130, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices. The I/O adapter 120 further communicates with application servers 170 and a file system directory 172.

The application servers 170 and the file system directory 172 may be associated with the storage device 122. Such servers/directories 170, 172 need not be incorporated within the storage device 122. Such servers/directories 170, 172 may be external to the storage device 122. One skilled in the art may contemplate different system and networking configurations for incorporating the servers/directories 170, 172 therein.

A speaker 132 is operatively coupled to system bus 102 by the sound adapter 130. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from the processing system 100.

Of course, the server processing system 100 may also include other elements (not shown), as readily contemplated by one of skill in the art, as well as omit certain elements. For example, various other input devices and/or output devices can be included in the server processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the server processing system 100 are readily contemplated by one of ordinary skill in the art given the teachings of the present invention provided herein.

Figure 2:
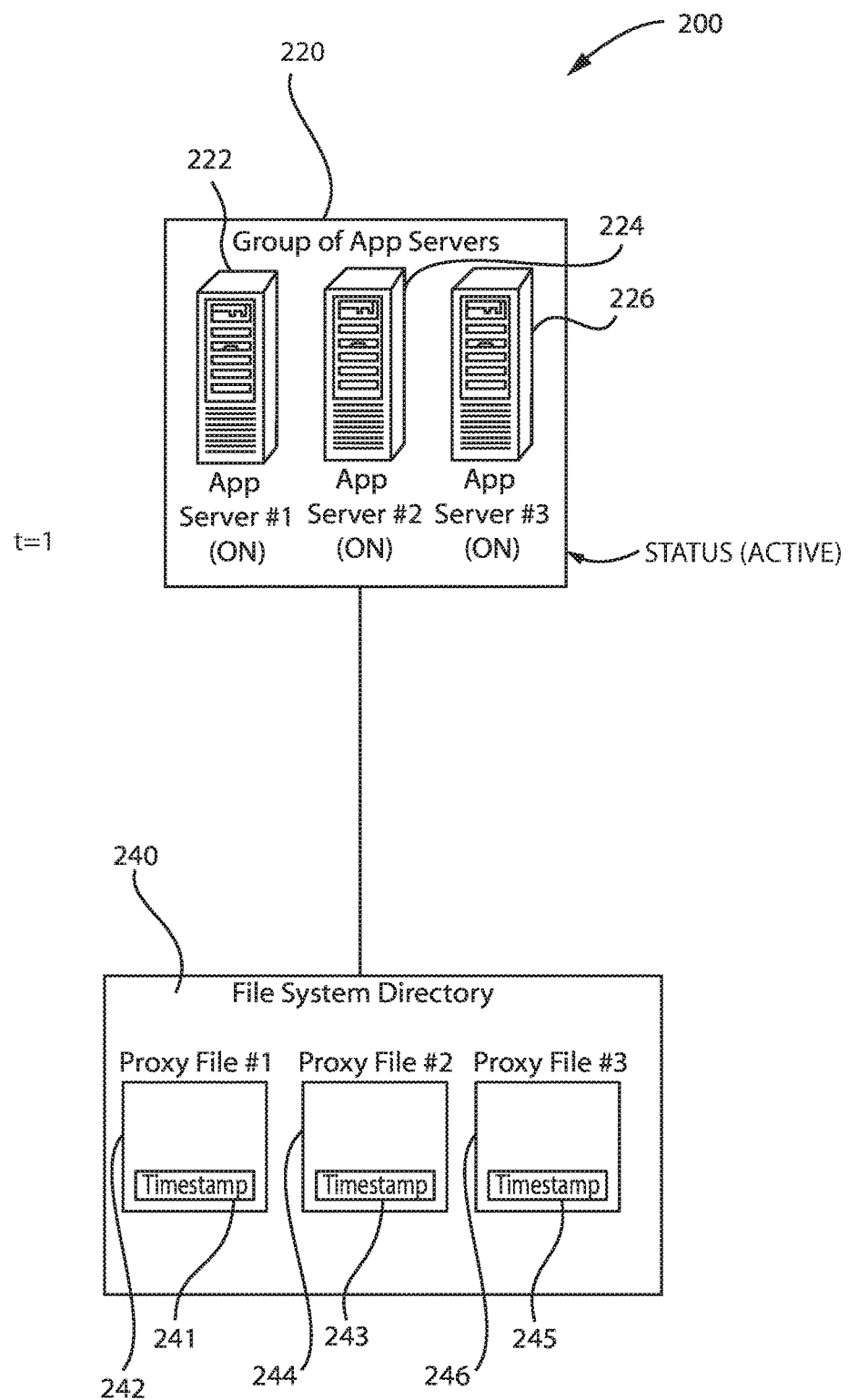
FIG. 2 is a block/flow diagram of an exemplary server failure detection system where each server in an active state creates a respective proxy file including a timestamp assigned thereto, in accordance with an embodiment of the present invention.

FIG. 2 is a block/flow diagram of an exemplary server failure detection system where each server in an active state creates a respective proxy file including a timestamp assigned thereto, in accordance with an embodiment of the present invention.

The system 200 includes a group of servers 220. The group of servers 220 can include, e.g., three application servers 222, 224, 226. The group of servers 220 can communicate with a file system directory 240. One skilled in the art may contemplate a number of different application servers within the server group.

When application servers 222, 224, 226 within the group of servers 220 are activated, a proxy file is created for each application server 222, 224, 226. In the instant case, all three application servers 222, 224, 226 are in an active state at first point in time (t=1). The proxy file of each application server is stored in the file system directory 240. For example, the first application server 222 has a first proxy file 242 with a first timestamp 241. The second application server 224 has a second proxy file 244 with a second timestamp 243. The third application server 226 has a third proxy file 246 with a third timestamp 245. Therefore, each active application server creates its own proxy file with a timestamp included therein.

Figure 3:
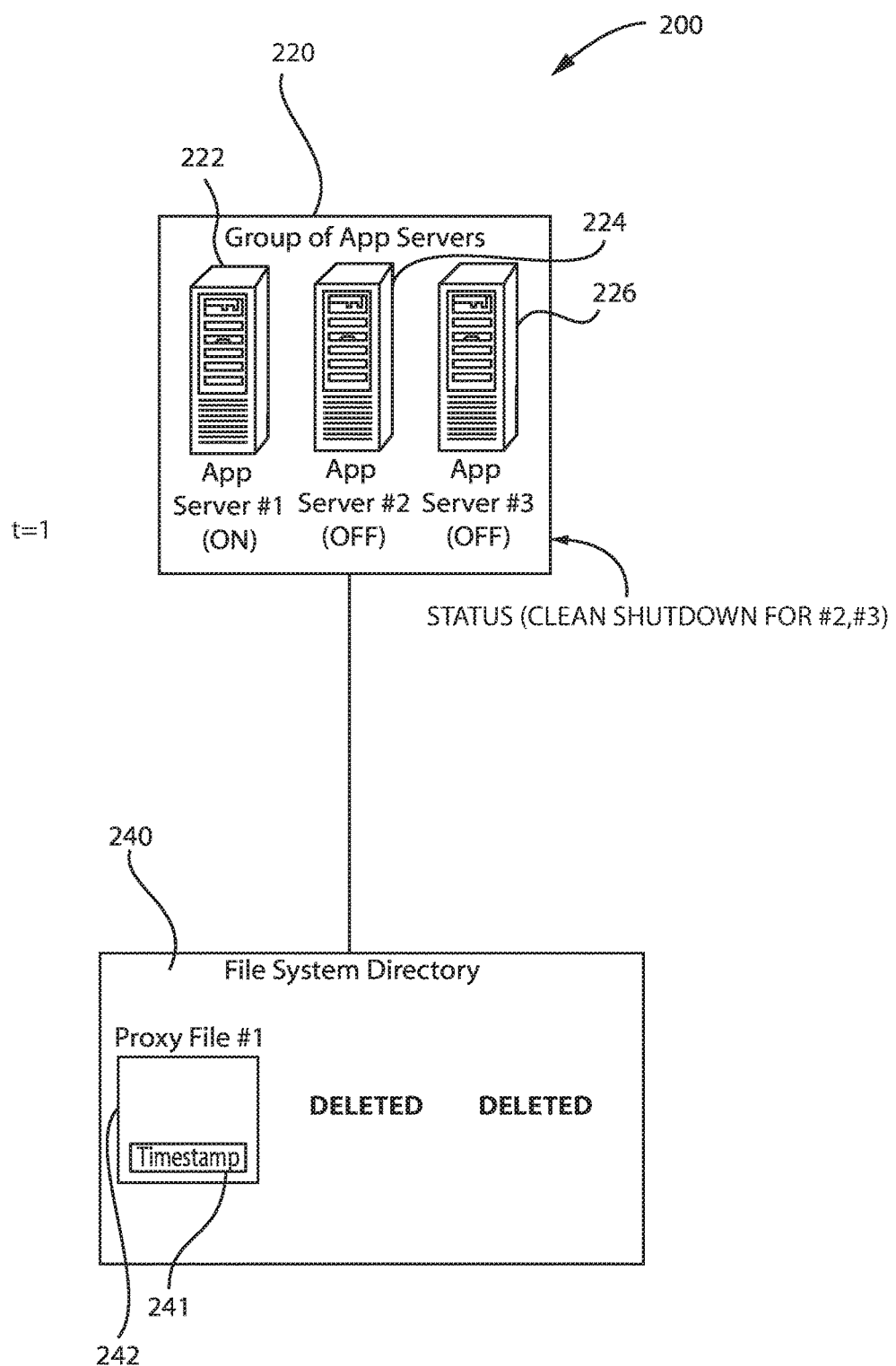
FIG. 3 is a block/flow diagram of an exemplary server failure detection system where proxy files of servers that are shut down cleanly are deleted, in accordance with an embodiment of the present invention.

FIG. 3 is a block/flow diagram of an exemplary server failure detection system where proxy files of servers that are shut down cleanly are deleted, in accordance with an embodiment of the present invention.

The system 200 includes a group of servers 220. The group of servers 220 can include, e.g., three application servers 222, 224, 226. The group of servers 220 can communicate with a file system directory 240. When application servers 222, 224, 226 within the group of servers 220 are activated, a proxy file is created for each application server 222, 224, 226. In the instant case, the first application server 222 is in an active state, whereas the second and third application servers 224, 226 have been shut down (clean shut down). As such, the proxy files of the second and third application servers 224, 226 are deleted in the file system directory 240. Therefore, each application server deletes its proxy file from the file system directory upon clean shutdown.

Figure 4:
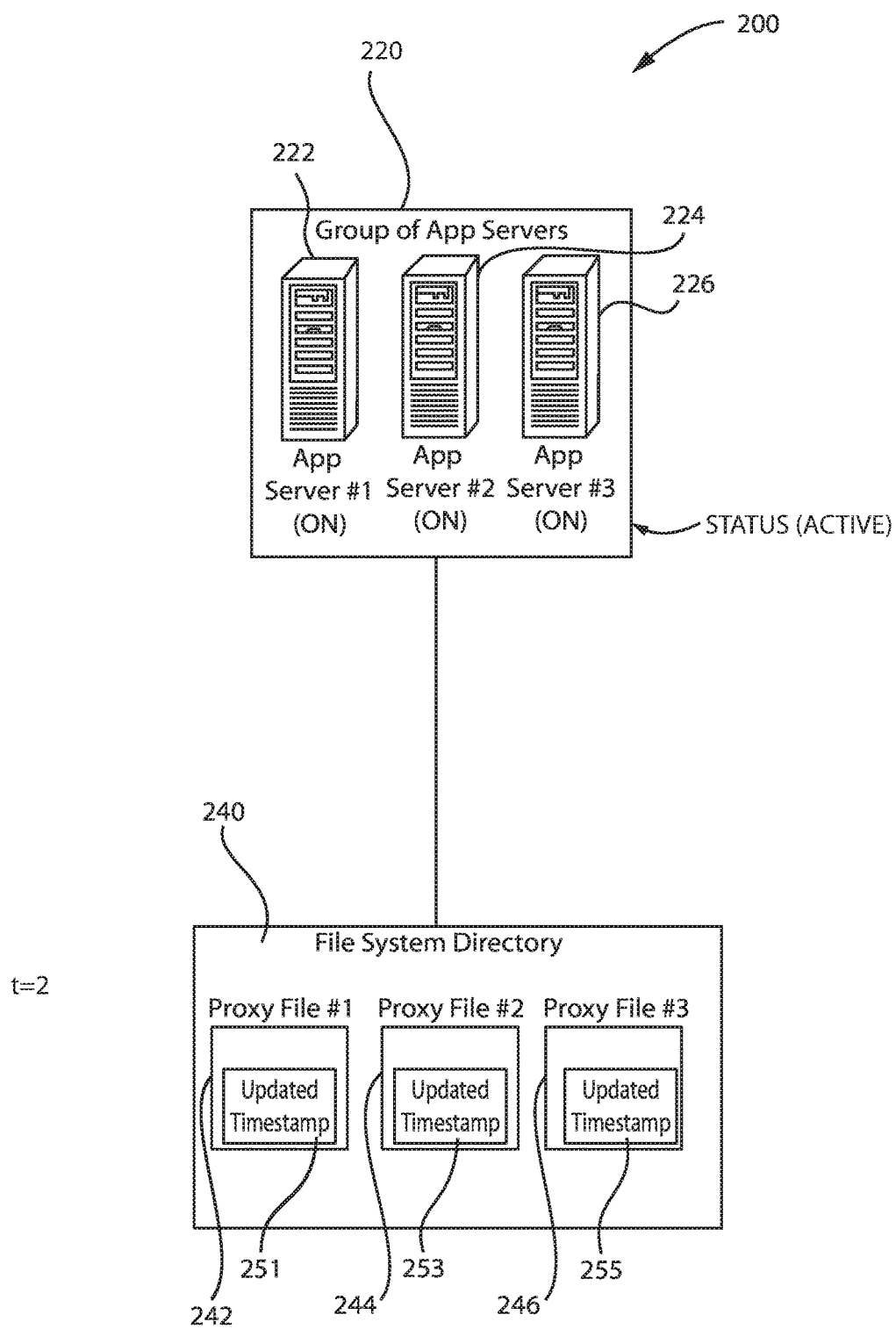
FIG. 4 is a block/flow diagram of an exemplary server failure detection system where each active server periodically updates its own timestamp, in accordance with an embodiment of the present invention.

FIG. 4 is a block/flow diagram of an exemplary server failure detection system where each active server periodically updates its own timestamp, in accordance with an embodiment of the present invention.

The system 200 includes a group of servers 220. The group of servers 220 can include, e.g., three application servers 222, 224, 226. The group of servers 220 can communicate with a file system directory 240. When application servers 222, 224, 226 within the group of servers 220 are activated, a proxy file is created for each application server 222, 224, 226. In the instant case, all three servers 222, 224, 226 are active and thus a proxy file 242, 244, 246 is associated with each server 222, 224, 226, respectively, where each proxy file 242, 244, 246 is associated with a respective or corresponding timestamp. FIG. 4 illustrates that each application server 222, 224, 226 has the capability to update its own timestamp at predetermined or predefined or pre-established time periods or intervals. For example, at time (t=2), the first application server 222 updated its timestamp (251) in proxy file 242, the second application server 224 updated its timestamp (253) in proxy file 244, and third application server 226 updated its timestamp (255) in proxy file 246. Therefore, each server can regularly update its timestamps while it is alive or active.

Figure 5:
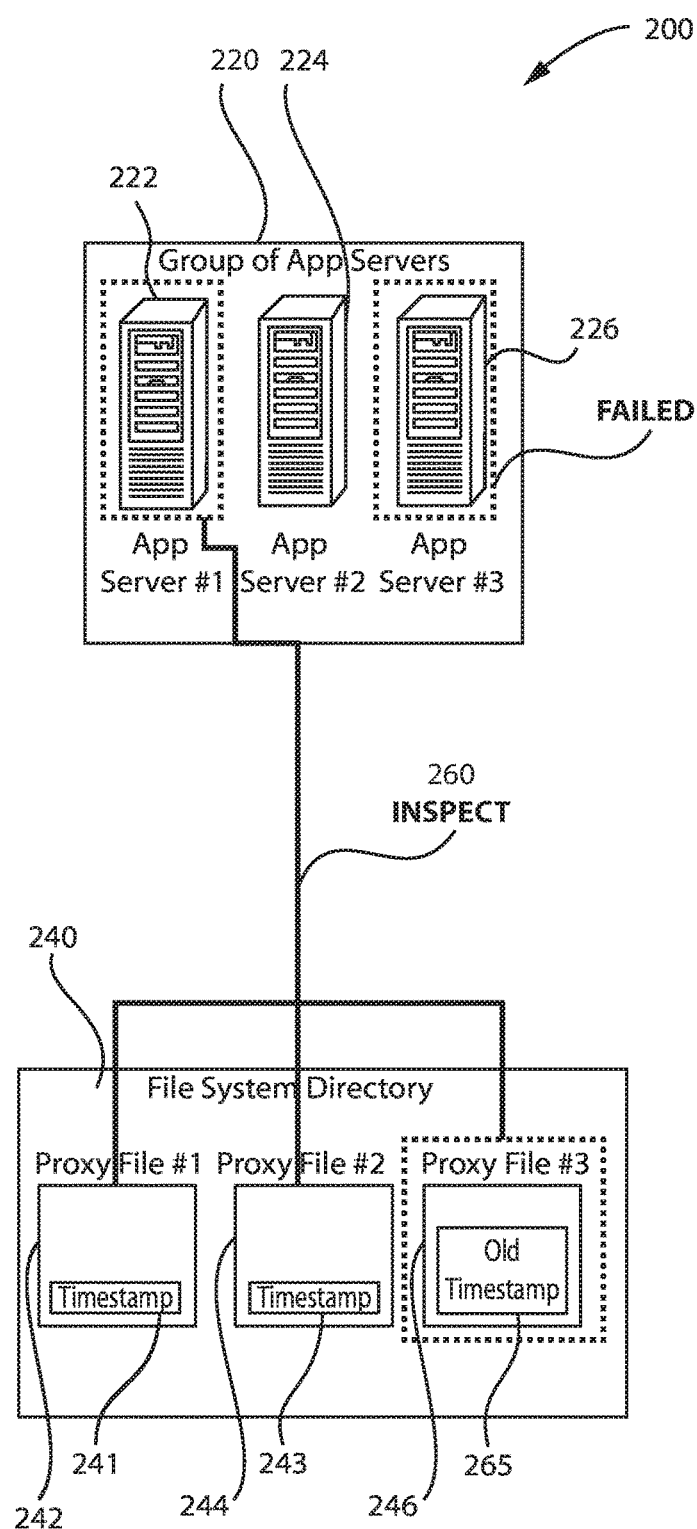
FIG. 5 is a block/flow diagram of an exemplary server failure detection system where each server inspects the timestamps of the proxy files belonging to other servers in the group of servers, in accordance with an embodiment of the present invention.

FIG. 5 is a block/flow diagram of an exemplary server failure detection system where each server inspects the timestamps of the proxy files belonging to other servers in the group of servers, in accordance with an embodiment of the present invention.

Referring back to FIG. 2, the first application server 222 can inspect its own timestamp 241 of proxy file 242 to determine if the timestamp 241 is up-to-date or current. Additionally, the first application server 222 can inspect the timestamps 243, 245 of the second and third proxy files 244, 246, respectively to determine if the timestamps 243, 245 are up-to-date or current. Similarly, the second application server 224 can inspect the timestamps 241, 245 of the first and third proxy files 242, 246, respectively to determine if the timestamps 241, 245 are up-to-date or current. Similarly, the third application server 226 can inspect the timestamps 241, 243 of the first and second proxy files 242, 244, respectively to determine if the timestamps 241, 243 are up-to-date or current. Therefore, the application servers 222, 224, 226 of the group of servers 220 can check or inspect each other's timestamps, in addition to checking and updating their own timestamps.

In FIG. 5, one of the application servers 222, 224, 226 detected that the timestamp 245 (FIG. 2) is "old," thus making the proxy file 246 associated with the third application server 226 "old" or "out-of-date." The timestamp 245 (FIG. 2) can now be designated as old timestamp 265 (FIG. 5) and the proxy file 246 can be designated as an old file. As a result, the third application server 226 is designated as a failed application server. When the third application server 226 is a failed application server, one of application servers 222, 224 can take ownership of the third application server 226 of the group of servers 220. In other words, one of application servers 222, 224 can attempt to complete the remaining work that was not finished by the third application server 226. Thus, all tasks assigned to the third application server 226 that have not been completed are reassigned either to or taken over by the first or second application servers 222, 224. The application servers 222, 224 that take over the remaining work can also establish a communication path 260 with the file system directory 240 to access the old proxy file of the third application server 226.

Figure 6:
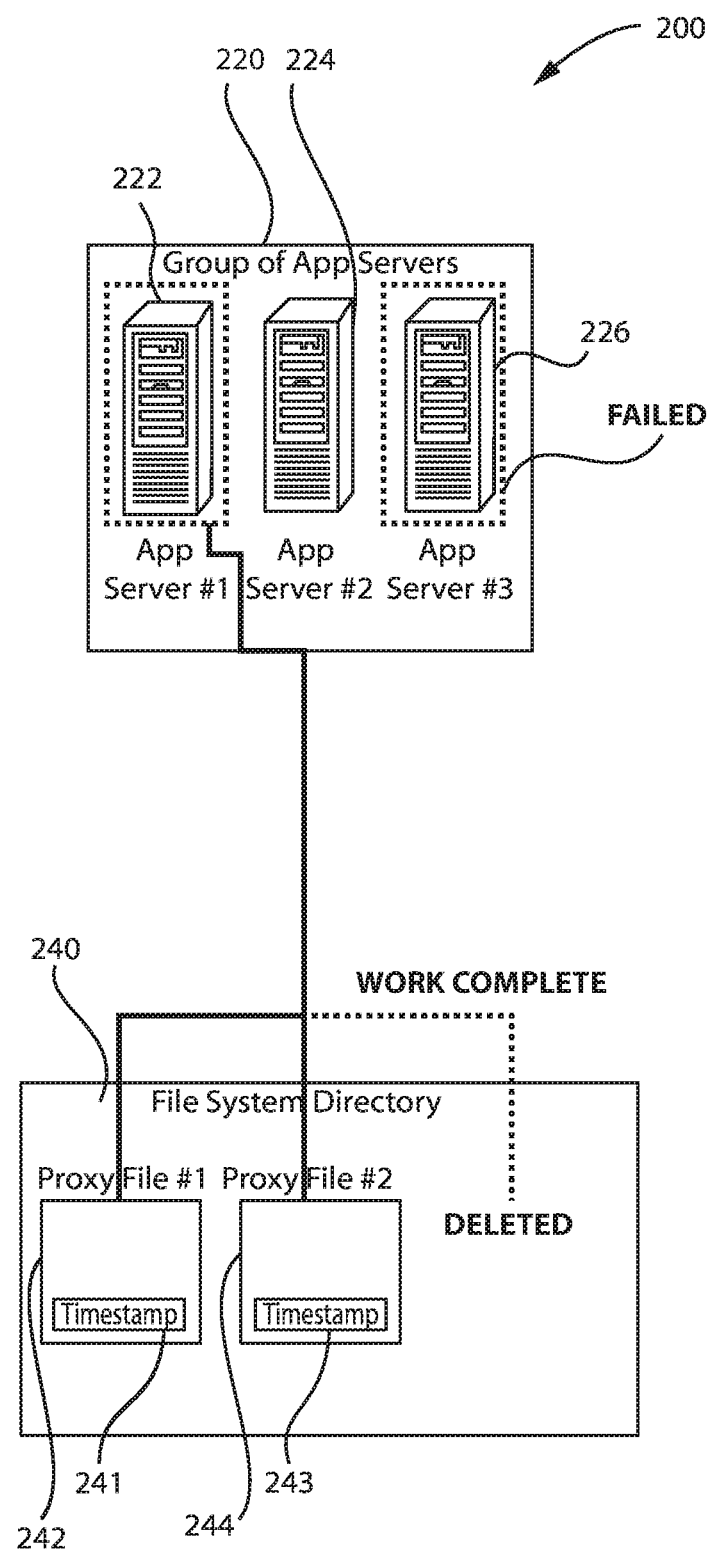
FIG. 6 is a block/flow diagram of an exemplary server failure detection system where the first server completes the remaining work of the third server and then deletes the proxy file of the third server, in accordance with an embodiment of the present invention.

FIG. 6 is a block/flow diagram of an exemplary server failure detection system where the first server completes the remaining work of the third server and then deletes the proxy file of the third server, in accordance with an embodiment of the present invention.

Once one of the application servers 222, 224 has completed all the remaining work or tasks not completed by the third application server 226, the old proxy file is deleted or removed from the file system directory 240. In one example, the one of the application servers 222, 224 can then send a notification to the third application server 226, which is still in a state of failure that all the remaining work or tasks have been completed. The third application server 226 is then deactivated (inactive state).

Figure 7:
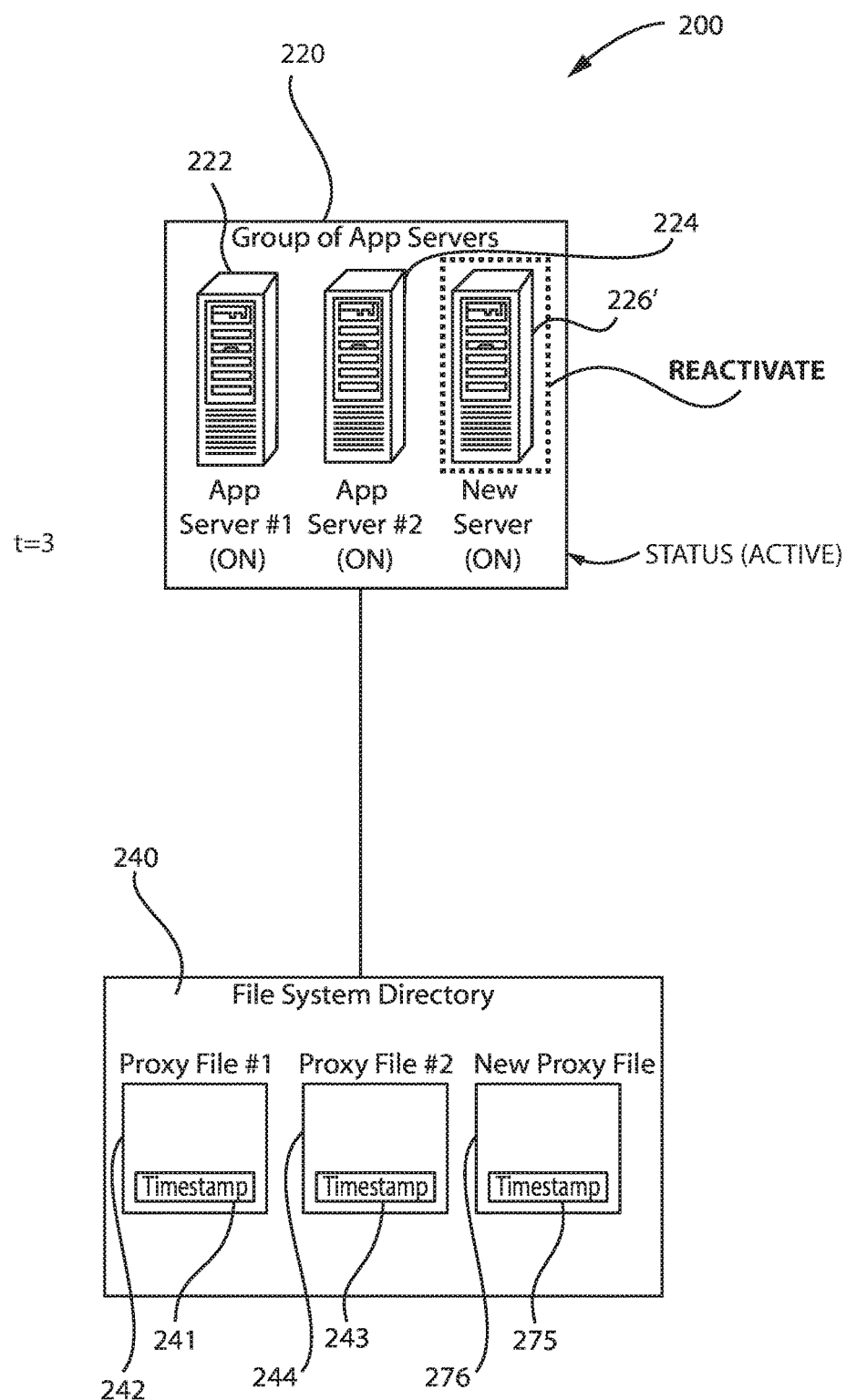
FIG. 7 is a block/flow diagram of an exemplary server failure detection system where the deactivated server is reactivated as a new server and creates a new proxy file within the file directory of the group of servers, in accordance with an embodiment of the present invention.

FIG. 7 is a block/flow diagram of an exemplary server failure detection system where the deactivated server is reactivated as a new server and creates a new proxy file within the file directory of the group of servers, in accordance with an embodiment of the present invention.

The failed application server 226 may never restart. However, if the failed application server 226 does restart or is reactivated, it starts or reactivates as a new server at a point in time (t=3). Therefore, when an application server fails as a result of an "old" or "out-of-date" timestamp associated with its proxy file, the application server can be deactivated, and an application server within the group of application servers can take its place by taking over ownership. Taking over ownership entails completing any and all remaining tasks or work not completed by the third application server. When all the remaining tasks or work have been completed by the takeover server, the old proxy file is deleted, the third application server can be reactivated as a new application server 226' of the group of servers 220, and a new proxy file 276 with a new timestamp 275 can be created in the file directory associated with the new application server 226'.

Figure 8:
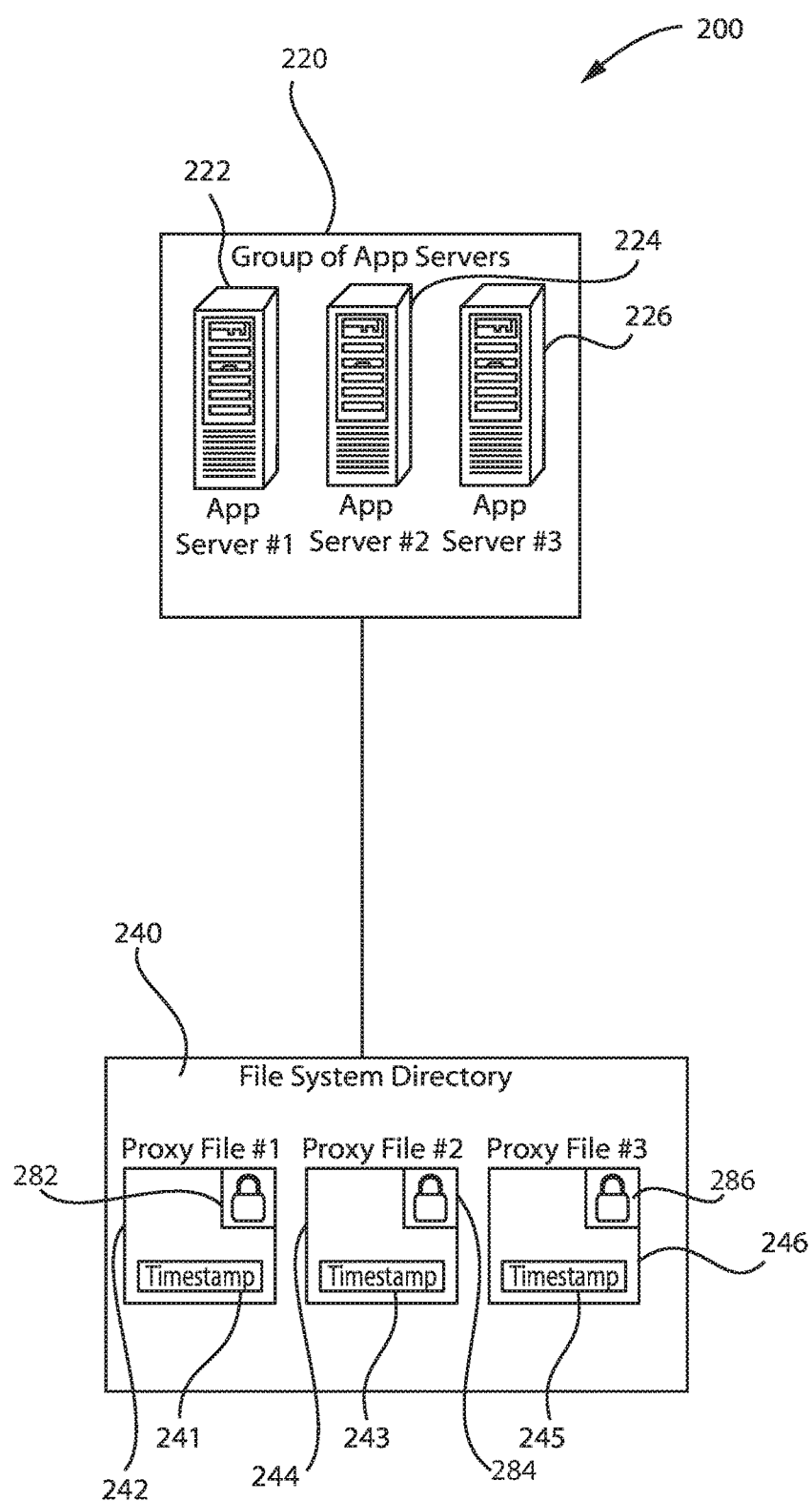
FIG. 8 is a block/flow diagram of an exemplary server failure detection system where each proxy file of each active server includes a file lock, in accordance with an embodiment of the present invention.

FIG. 8 is a block/flow diagram of an exemplary server failure detection system where each proxy file of each active server includes a file lock, in accordance with an embodiment of the present invention.

Each of the proxy files associated with each application server can include a file lock. For example, the first proxy file 242 includes a file lock 282, the second proxy file 244 includes a file lock 284, and the third proxy file 246 includes a file lock 286. The file locks 282, 284, 286 prevent more than one application server 222, 224, 226 from accessing a single failed application server. For instance, if the first application server 222 fails, then one of the peer servers 224, 226 needs to jump in and take over ownership of the remaining work or tasks to be completed by the first application server 222. If the second 224 application server takes over the first application server 222, then the file lock 282 associated with the first proxy file 242 of the first application server 222 prevents the third application server 226 from taking over ownership the remaining work or tasks of the first application server 222. Therefore, it is assured that only one application or peer server takes over the remaining tasks or work of only one failed application server. Therefore, one peer application server per one failed application server is desired.

Figure 9:
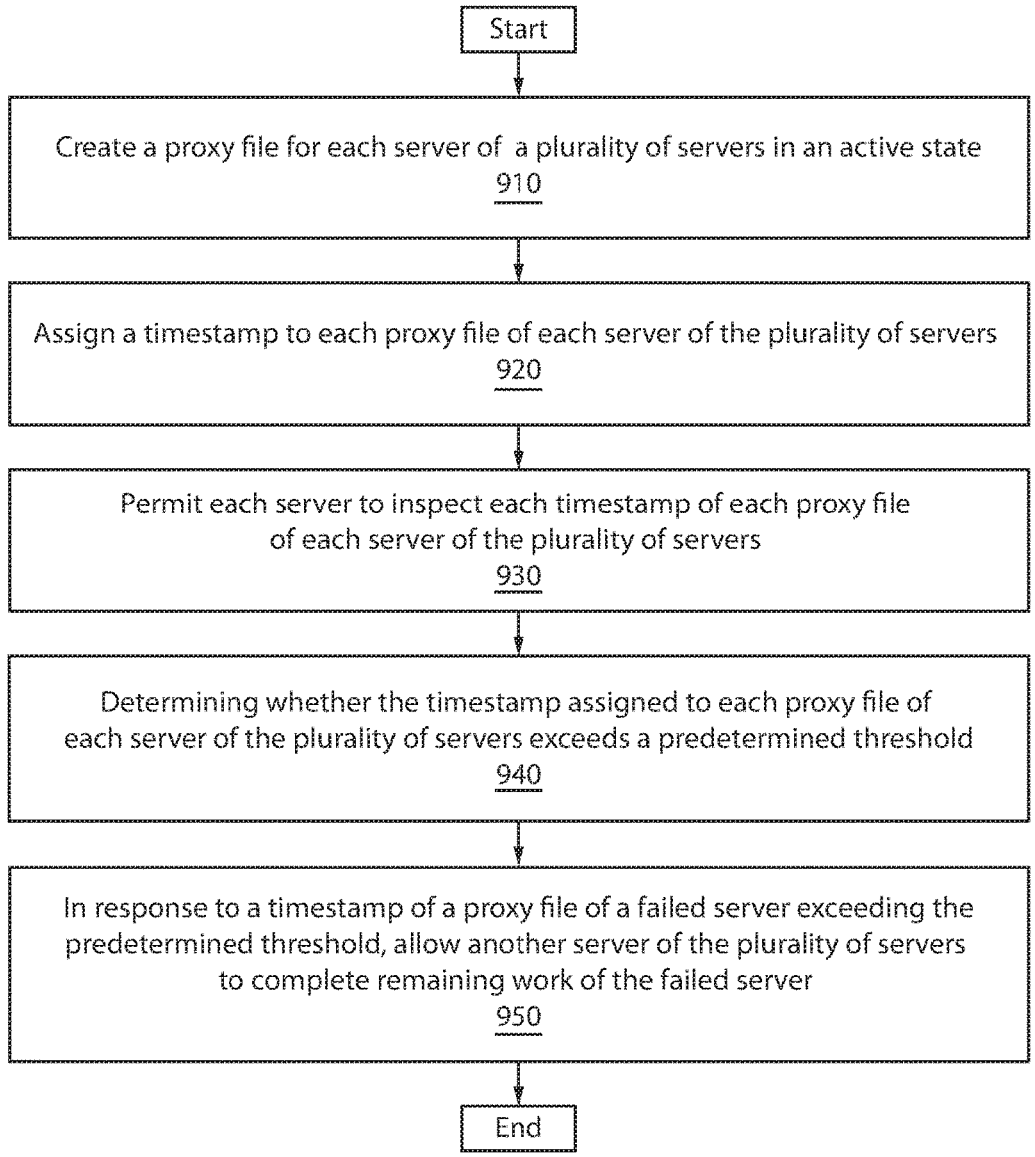
FIG. 9 is a block/flow diagram of an exemplary method for detecting a failed server, in accordance with an embodiment of the present invention.

FIG. 9 is a block/flow diagram of an exemplary method for detecting a failed server, in accordance with an embodiment of the present invention.

At block 910, a proxy file is created for each server of a plurality of servers in an active state.

At block 920, a timestamp is assigned to each proxy file of each server of the plurality of servers.

At block 930, each server is permitted to inspect each timestamp of each proxy file of each server of the plurality of servers.

At block 940, it is determined whether the timestamp assigned to each proxy file of each server of the plurality of servers exceeds a predetermined threshold.

At block 950, in response to a timestamp of a proxy file of a failed server exceeding the predetermined threshold, another server of the plurality of servers is allowed to complete the remaining work or tasks of the failed application server.

In one or more embodiments, the application or peer servers within the group of servers can be ranked or weighed or classified based on different factors or parameters or variables. For instance, a relationship can be established between the remaining work of the failed application server and, e.g., the processing capabilities of the available application servers. If the failed application server has several heavy or intense or time-consuming tasks to complete, then an application server having the processing capability to process heavy or intense or time-consuming tasks can be assigned to the failed application server. Therefore, e.g., the processing power of the application server can be taken into account when takeover of a failed application server is triggered. Thus, each of the application servers within a group of servers can be ranked based on, e.g., processing power or processing capabilities. Each application server within a group of application servers can be ranked based on other factors, such as previous uses, specialized functionality, number of processors, processor speed, location of peer server, etc. As a result, assignments to failed application servers can be influenced or affected or determined by analyzing operations or functions or capabilities of available application servers within the group of servers.

In one or more embodiments, the time it takes to complete the remaining tasks or work of each application server can be taken into account when assigning an application server to the failed application server. For instance, if a first application server has, e.g., 3 remaining tasks and it is calculated that it would take, e.g., 5-10 minutes to complete such tasks, then a simple application server with relatively low processing capabilities can be assigned to take over ownership of such failed application server. In contrast, if a second application server has, e.g., 150 remaining tasks and it is calculated that it would take, e.g., 3-4 hours to complete such tasks, then a hard-core application server with relatively high processing capabilities can be assigned to take over ownership of such failed application server. Therefore, the time it would take remaining tasks or work to be completed can be factored into application server assignments. Application servers with very high processing power can be saved for "special" processing tasks or work that needs to be completed.

In one or more embodiments, an application server within a group of application servers can monitor or track each timestamp of each application server within that group of application servers. However, it is also contemplated that an application server within a group of application servers monitors a subset of the other application servers. For instance, if the server group includes 100 application servers, then the group of servers can be subdivided or split into several sub-groups or subsets (e.g., 4 subsets). Each subset can be monitored by one application server, and each subset can monitor itself. One skilled in the art may contemplate different self-regulating or self-inspecting strategies depending on the number of application servers within the group of servers.

Figure 10:
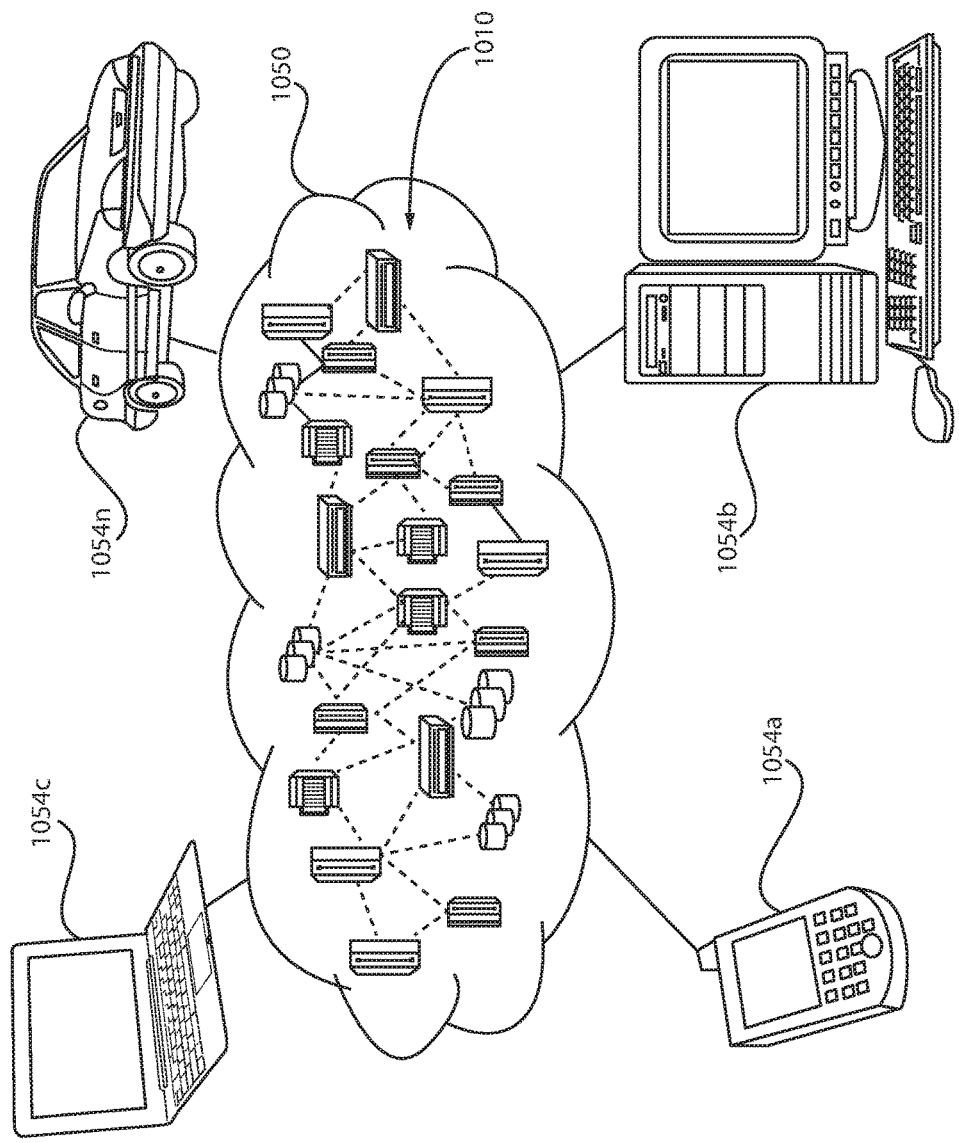
FIG. 10 is a block/flow diagram of an exemplary cloud computing environment, in accordance with an embodiment of the present invention.

FIG. 10 is a block/flow diagram of an exemplary cloud computing environment, in accordance with an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 10, illustrative cloud computing environment 1050 is depicted for managing server processes with proxy files. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. The network may also be a network for managing server processes with proxy files. The This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
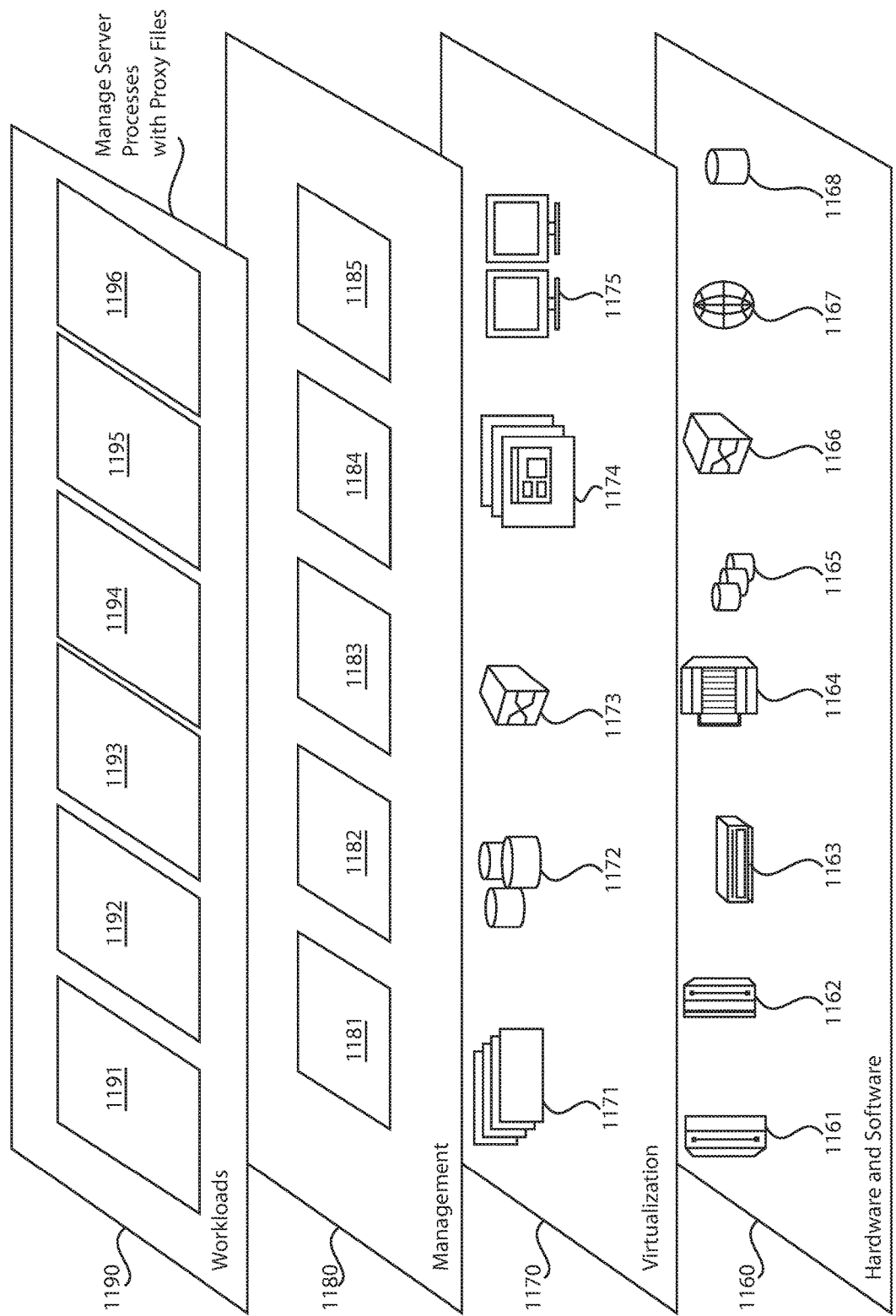
FIG. 11 is a schematic diagram of exemplary abstraction model layers, in accordance with an embodiment of the present invention.

FIG. 11 is a schematic diagram of exemplary abstraction model layers, in accordance with an embodiment of the present invention. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and managing server processes with proxy files 1196.

Still yet, any of the components of the present invention could be created, integrated, hosted, maintained, deployed, managed, serviced, etc. by a service supplier who offers to provide a method for detecting a failed server. Thus, the present invention discloses a process for deploying, creating, integrating, hosting, maintaining, and/or integrating computing infrastructure, including integrating computer-readable code into the server procesing system 100 (FIG. 1), wherein the code in combination with the server processing system 100 is capable of detecting a failed server. In another embodiment, the invention provides a business method that performs the process blocks/steps of the invention on a subscription, advertising, and/or fee basis. That is, a service supplier, such as a Solution Integrator, could offer to provide a method for detecting a failed server. In this case, the service supplier can create, maintain, support, etc. a computer infrastructure that performs the process blocks/steps of the invention for one or more customers. In return, the service supplier can receive payment from the customer(s) under a subscription and/or fee agreement and/or the service supplier can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method executed on a processor for detecting a faded server, the method comprising: creating a proxy the for each server of a plurality of servers in an active state;
assigning a timestamp to each proxy the of each server of the plurality of servers; permitting each server to inspect each timestamp of each proxy file of each server of the plurality of servers;
determining whether the timestamp assigned to each proxy the of each server of the plurality of servers exceeds a predetermined threshold; and
in response to the timestamp of a proxy the of a faded server exceeding the predetermined threshold, allowing another server of the plurality of servers to complete remaining work of the faded server.

2. The method of claim 1, further comprising storing each proxy file of each server of the plurality of servers in a file directory.

3. The method of claim 1, further comprising periodically updating the timestamp of each proxy file of each server of the plurality of servers.

4. The method of claim 1, wherein each server creates a proxy file to represent itself.

5. The method of claim 1, wherein, when the remaining work is completed by another server, the failed server is not reactivated.

6. The method of claim 1, wherein, when the remaining work is completed by another server, the failed server is reactivated as a new server.

7. The method of claim 6, wherein the new server creates a new proxy file stored in a file directory storing each proxy file of each server of the plurality of servers.

8. The method of claim 1, further comprising assigning a file lock to each proxy file of each server of the plurality of servers to prevent more than one server from completing work of more than one failed server.

9. The method of claim 1, further comprising subdividing the plurality of servers into groups and assigning a server of a first group to a first failed server and a server of a second group to a second failed server.

10. A computer system for detecting a failed server, the computer system comprising:
a memory; and
a processor in communication with the memory, wherein the processor is configured to:
create a proxy the for each server of a plurality of servers in an active state;
assign a timestamp to each proxy file of each server of the plurality of servers;
permit each server to inspect each timestamp of each proxy file of each server of the plurality of servers;
determine whether the timestamp assigned to each proxy file of each server of the plurality of servers exceeds a predetermined threshold; and
in response to the timestamp of a proxy file of a faded server exceeding the predetermined threshold, allow another server of the plurality of servers to complete remaining work of the faded server.

11. The computer system of claim 10, wherein each proxy file of each server of the plurality of servers is stored in a file directory.

12. The computer system of claim 10, further comprising periodically updating the timestamp of each proxy file of each server of the plurality of servers.

13. The computer system of claim 10, wherein each server creates a proxy file to represent itself.

14. The computer system of claim 10, wherein, when the remaining work is completed by another server, the failed server is not reactivated.

15. The computer system of claim 10, wherein, when the remaining work is completed by another server, the failed server is reactivated as a new server.

16. The computer system of claim 15, wherein the new server creates a new proxy file stored in a file directory storing each proxy file of each server of the plurality of servers.

17. The computer system of claim 10, further comprising assigning a file lock to each proxy file of each server of the plurality of servers to prevent more than one server from completing work of more than one failed server.

18. The computer system of claim 10, further comprising subdividing the plurality of servers into groups and assigning a server of a first group to a first failed server and a server of a second group to a second failed server.

19. A computer readable storage medium comprising a computer readable program for detecting a failed server, wherein the computer readable program when executed on a computer causes the computer to perform the steps of:

creating a proxy the for each server of a plurality of servers in an active state;

assigning a timestamp to each proxy file of each server of the plurality of servers; permitting each server to inspect each timestamp of each proxy file of each server of the plurality of servers;

determining whether the timestamp assigned to each proxy file of each server of the plurality of servers exceeds a predetermined threshold; and in response to the timestamp of a proxy the of a faded server exceeding the predetermined threshold, allowing another server of the plurality of servers to complete remaining work of the faded server.

20. The computer readable storage medium of claim 19, wherein the method further comprises:

storing each proxy file of each server of the plurality of servers in a file directory; and periodically updating the timestamp of each proxy file of each server of the plurality of servers.

* * * * *